United States Patent [19]

Van de Walle

[11] Patent Number: 4,775,539
[45] Date of Patent: Oct. 4, 1988

[54] REACTIVE NUTRITIVE FEED BINDER

[75] Inventor: Richard H. Van de Walle, Columbia, Md.

[73] Assignee: Martin Marietta Corporation, Bethesda, Md.

[21] Appl. No.: 900,656

[22] Filed: Aug. 26, 1986

[51] Int. Cl.$^4$ ............................................... A23K 1/00
[52] U.S. Cl. ...................................... 426/74; 426/623; 426/630; 426/626; 426/807
[58] Field of Search ................... 426/72, 74, 454, 807, 426/623, 630, 626

[56] References Cited

U.S. PATENT DOCUMENTS

| Re. 31,804 | 1/1985 | Skoch et al. | 426/630 X |
| 2,162,609 | 6/1939 | Dawe | 426/807 |
| 4,016,296 | 4/1977 | De Santis | 426/658 X |
| 4,027,043 | 5/1977 | Schroeder et al. | 426/74 |
| 4,082,859 | 4/1978 | Katzen | 426/626 X |
| 4,265,916 | 5/1981 | Skoch et al. | 426/74 |
| 4,431,675 | 2/1984 | Schroeder et al. | 426/74 |

FOREIGN PATENT DOCUMENTS

| 588006 | 4/1925 | France. |
| 2344231 | 10/1977 | France. |
| 60-75240 | 4/1985 | Japan. |
| 8201463 | 5/1982 | PCT Int'l Appl.. |
| 957963 | 5/1964 | United Kingdom. |
| 1009134 | 11/1966 | United Kingdom. |
| 1073258 | 6/1967 | United Kingdom. |

Primary Examiner—R. B. Penland
Attorney, Agent, or Firm—Herbert W. Mylius; Gay Chin

[57] ABSTRACT

This invention constitute a novel binder composition for pelleted and compressed animal feeds, comprising a mixture of a reactive metal salt and a reactive metal oxide or hydroxide.

15 Claims, No Drawings

REACTIVE NUTRITIVE FEED BINDER

BACKGROUND OF THE INVENTION

The present invention relates to a chemically reactive nutritive binder useful in pelleted and compressed animal feeds. The inventive binder comprises a mixture of a reactive metal salt, and a reactive metal oxide or hydroxide, which mixture is utilized in combination with conventional animal feed materials and vitamins.

In recent years, pelleted animal feed has become a dominant factor in feeding both monogastric and ruminent animals. There are several advantages to feeding pelleted feeds: (1) pelleted feeds prevent selective feeding on those ingredients in the formulation which are more palatable and thus more desirable to the animal; (2) pelleting of the feed ration prevents segregation of the various size and density constituents which are inherent in animal feeds; (3) pelleting animal feed results in higher bulk density, which is advantageous for both shipping and handling, resulting in maximum load efficiency and reduced storage requirements; and (4) pelleting also increases nutritional utilization of the feed components, thus increasing conversion rate of the feed formulation.

Feed pelleting is, as commonly practiced, an extrusion type thermoplastic molding operation in which finely divided particles of a feed ration are formed into compact, easily handled pellets. To improve the strength and durability of pellets, and reduce fines produced during the pelleting process, several feed binder additives have been recommended. One of the commonly used ingredients for such purpose is molasses. However, this product tends to reduce lubrication of the feed ingredients through the die of the pelleting equipment, resulting in decreased production rates and increased energy costs.

Additional materials which have been recommended and used as binders, or binding agents, for pelleting animal feeds include clays, in particular bentonite clay and attapulgite clay; lignin sulfonates, a byproduct of the paper pulping industry, and gums, such as natural cellulose gum combinations. In addition, such products as sodium carboxymethylcellulose have been used to increase pellet quality.

The clay and lignin sulfonate products are normally employed as binding agents at rates of from 1.5 percent to 3.5 percent, by weight. Nutrient value of such products, however, particularly the clays, is minimal, so considerable volume is used in the formulation with little or no contribution to nutritional value. Gums are normally used at much lower concentrations, in the range of 0.05 percent to 0.2 percent, by weight. However, the cost of such materials often precludes their use, particularly at the higher more effective concentrations.

SUMMARY OF THE INVENTION

The present invention comprises an improved chemically reactive binder-additive for densifying and bonding finely divided feed particles which increases the durability of the compressed feed pellets, while at the same time reducing the amount of fines produced during the pelleting process. In addition, this invention provides essential recognized nutrients such as magnesium, calcium, potassium and/or sulfur to the finished feed formulation.

A binder as set forth herein performs equally well when the feed materials are subjected to pelleting, or when the feed/binder mixture is subject to mechanical densification to form blocks and briquettes. In contrast, binders of the prior art are less efficiently utilized for both pelleting (extrusion) and mechanical densification (blocking or briquetting), since they do not possess the high degree of nutritive value present in the instant binders. Accordingly, while a common method for animal feed pelleting is described herein, it is to be understood that the present invention is also useful for other methods of extruding or mechanically shaping feed materials.

DESCRIPTION OF PREFERRED EMBODIMENTS

The novel chemically reactive feed binder composition of this present invention is composed of a reactive metal salt source, hereafter called a "reactive salt", and a reactive metal oxide or hydroxide. The reactive salt may be selected from calcium chloride, magnesium chloride, potassium chloride, aluminum chloride, magnesium sulfate, potassium sulfate, potassium magnesium sulfate, calcium sulfate, aluminum sulfate, or mixtures of the above or other reactive salts which would be suitable animal feed additives. The reactive metal oxide may be magnesium oxide, calcium oxide, aluminum oxide, potassium oxide or calcium magnesium oxide (dolime), while the hydroxide may be selected from magnesium hydroxide, aluminum hydroxide, magnesium calcium hydroxide, potassium hydroxide, or calcium hydroxide. Combinations of the above or other reactive oxides or hydroxides which would be suitable as animal feed additions may also be utilized.

Alternatively, a reactive acid or combination of commercially available acids, such as sulfuric acid or hydrochloric acid, or others, may be reacted with a reactive metal oxide or a hydroxide such that the oxide or hydroxide, or combination thereof, is in excess of the stoichiometric neutralization value, thus forming the same type of reactive binder combinations as the reactive salt and reactive oxide or hydroxide systems mentioned earlier. For ease of handling, however, the combination of a reactive salt and reactive metal oxide or hydroxide is most preferred.

Several factors concerning the reactive salt source are important in utilizing the material as one component of the described chemically reactive feed binder composition. The first factor is purity of material. The material should be an approved animal feed product and be of a purity level that will meet feed grade requirements. Higher purity such as technical grade or food grade is also appropriate for such use, and usually means a higher concentration of reactive salt and can thus be used at lower levels.

An additional factor important in the proper choice of a reactive salt is particle size. Appropriate particle size can range from not greater than minus 16 mesh U.S. sieve scale to about minus 325 mesh. The preferred size range is from about 50 mesh to about 325 mesh.

Magnesium chloride, magnesium sulfate, potassium sulfate and magnesium potassium sulfate are particularly suitable as the reactive metal salt component of the instant invention as they have a high degree of chemical reactivity with the other component of the binder, and contain a high level of nutrient value, thus contributing both binding ability and required nutrients to the feed formulation.

The reactive metal salt source which is utilized in the instant invention is used in a concentration of from about 0.25 percent to 5 percent, by weight, of the total feed formulation, expressed as the metal salt. The most preferred level is from about 0.4 percent to 2 percent, by weight, expressed as the metal salt.

Of the reactive metal oxides and hydroxides suitable in this disclosed invention, magnesium oxide, calcium oxide and calcium magnesium oxide (dolime) are most suitable, as they have a high degree of chemical reactivity with the other component of the binder when utilized with proper specifications of surface area and sizing.

The reactive metal oxide or hydroxide should be a material which is animal feed approved, and which exhibits a particle size of from about 16 mesh U.S. sieve scale to about 325 mesh. The most desirable sizing is from 100 mesh U.S. sieve scale to about 325 mesh.

Typically, the amount of reactive metal oxide or hydroxide which is utilized in the instant invention is from about 0.50 percent to 5 percent, by weight, of the total feed formulation. The most preferred levels of use are from 1.0 percent to 2.5 percent of the total feed formulation expressed as the oxide.

High purity magnesium oxide, for purposes of this invention, is typically the product of reacting magnesium chloride solution, for example as contained in seawater or magnesium chloride brine, with lime (CaO), or dolomitic lime (MgO.CaO), to precipitate insoluble magnesium hydroxide, which is calcined to between about 650° C. and about 1150° C., usually in a multiple hearth or rotary kiln. This results in a magnesium oxide product with a B.E.T. surface area of between 10 meters squared per gram and 120 meters squared per gram. Alternatively, magnesium oxide with approximately the same surface area specifications can be produced commercially by calcining natural magnesite ($MgCO_3$).

Calcium oxide is the product of calcination of calcitic limestone ($CaCO_3$). Calcitic limestone can be calcined by various methods including in a shaft kiln, in an indirect gas-fired kiln, in a mixed feed kiln, in a parallel flow regeneration kiln, or in a rotary kiln, usually at about 870° C. to about 1150° C. The calcium oxide useful for this invention would preferably exhibit a B.E.T. surface area from about one meter squared per gram to about 2 meters squared per gram.

Calcium magnesium oxide (dolime) is the product of calcination of dolomitic limestone ($CaCo_3.MgCO_3$). Dolomite limestone can be calcined by any of the methods listed for calcitic limestone, above. Regardless of the method of calcination, this invention can utilize high purity dolime which has been calcined in the temperature range from about 1090° C. to about 1650° C. Calcined high purity dolime would range in analysis from approximately 40 to 42 percent MgO and 56 to 58 percent CaO.

Typical dolime surface area for the purpose of this invention would range from 2 meters squared per gram to approximately 6 meters squared per gram as measured by the B.E.T. surface area method.

The two components of the feed pellet binder system, namely the reactive metal oxide or hydroxide and the reactive salt, are admixed to obtain a uniform blend of materials. The ratio of metal oxide or hydroxide, expressed as the metal oxide to the reactive salt, can range from 4:1 to 1:4; however, the most preferred ratio for this admixed combination is from about 1:3 to about 3:1 metal oxide to reactive salt.

The blended ratio of metal oxide or hydroxide and reactive salt is then added to the total feed formulation prior to pelleting.

Alternatively, the desired ratio of metal oxide or hydroxide to reactive salt can be admixed separately into the complete feed formulation which is to be pelleted, providing that sufficient mixing is available to completely disperse the metal oxide or hydroxide and the reactive salt throughout the feed mixture prior to pelleting.

In the feed pelleting process, various feed ingredients chosen from the list comprising, but not limited to, dehydrated alfalfa, barley, beet pulp, blood meal, brewers grain, buttermilk, citrus pulp, coconut meal, corn, corn cob and meal, corn gluten feed, corn gluten meal, corn oil meal, cottonseed meal, distillers grain, distillers solubles, fish meal, hominy, kafir corn, kafir head chop, linseed meal, meat scrap, milo maize, milo head chop, molasses, oats, oat hulls, oat screening, peanut meal, rice bran, rice polishings, soybean meal, wheat, wheat-mids, wheat flour, wheat bran, whey, bone meal and urea, are uniformly mixed. In addition, minerals and mineral supplements and various drug and drug combinations may also be incorporated.

In the practical application and use of this invention, the novel chemically reactive feed binder combination is added to the formulation containing various ground feed ingredients, minerals, vitamins, and drug additives. The complete mixture is usually blended in a ribbon mixer or vertical mixer in two or three ton batches. Each batch is then delivered to overhead bins above the pellet mill.

The mixture of ingredients, or meal mixture, flows by gravity into a flow rate regulator called a feeder, which provides a constant feed rate to the conditioning chamber. In the conditioning chamber, the entire meal mixture is subjected to steam prior to the actual pelleting step. Most liquids which may be introduced into the formulation, such as molasses, are also added through the conditioning chamber. Steam conditioning supplies moisture for lubrication, and partly gelatinizes starches. Steam addition at this point in the process also aids in solubilizing any soluble reactive salt component of the stated invention, thus increasing the rate of reaction of the binder combination. The amount of total moisture which is contained in the feed mixture is raised to a level normally of from about 12 percent to 16 percent, by weight, of the feed formulation, as a result of liquid and steam addition.

The temperature of the feed is raised about 10° to 66° C. above the ambient temperature as a result of steam addition, which also increases the rate of reaction of the binder ingredients.

Pelleting of the feed is next accomplished by gravity flow of the steam conditioned feed ingredients, now called mash, into the pellet mill die chamber. In the die chamber, usually two or three rollers push the softened mash through holes in a circular die. Typical hole diameter in these dies is 3/32 inch to 5/16 inch. Knives positioned outside the die then cut the extruded densified pellet to proper length. Alternate die types may produce pellets of variable shapes, including cubes, squares, and large diameter round pellets.

Typical formed pellet temperature usually ranges from about 66° C. to about 100° C.. Hot pellets are usually cooled by forced air through vertical or horizontal cooling systems to near ambient temperature.

As a result of the addition of the selected reactive oxide or hydroxide source in combination with the selected reactive salt to the feed formulation, uniformly mixed prior to the steam conditioning step, a significant increase in pellet durability is obtained, as measured by the Kansas State Feed Pellet Durability Test. In addition, a significant reduction in fines, typically as measured from the pellet cooler after pelleting, is also attained.

Although the entire reaction mechanism of the instant invention is not fully understood, it is postulated that the reactive metal oxide or hydroxide source, when present at the levels specified above, exothermically reacts with the reactive salts, when supplied in the quantities directed, to produce a metal oxysulfate or metal oxychloride cement-like compound, which sets and strengthens the pellet, improves pellet durability, and reduces fines. For example, in the particular instance of the binder of the instant invention being comprised of magnesium oxide and magnesium chloride, the resulting cohesive bond is thought to be primarily magnesium oxychloride.

It is also possible that the reactive metal oxide, under particular feed manufacturing conditions, additionally reacts with other components of the total feed formulation which may become soluble during steam addition, thus becoming available for reaction to complement the primary cohesive binding action of the described invention. The scope of this disclosed invention, however, does not depend upon such additional or secondary reaction to be fully effective.

A further significant aspect of this invention is the feed nutrient value which is contained in the chosen binder ingredients. Magnesium from magnesium oxide, for example, is a widely recognized essential element for proper nutrition, especially to maintain magnesium serum level in dairy and beef cattle. Providing magnesium from a source which is both chemically reactive for feed binding purposes and at the same time available as a feed nutrient, eliminates the need for adding an additional magnesium source for nutrient value only, thus permitting the addition of other needed ingredients.

Reactive salts perform a similar dual function by providing, as in the case of calcium chloride, one component of the disclosed binder system, in addition to calcium as a source of essential feed nutrient.

The following examples are not intended to limit the scope of this invention, but only to illustrate practical application of use.

EXAMPLE I

Under plant conditions, the following 20 percent protein dairy formulations were mixed and pelleted. Formulation I utilizes a conventional lignin sulfonate binder, at 33 pounds per ton of finished feed. Formulation II utilizes a combination of calcined dolomitic limestone (dolime) and magnesium potassium sulfate at 40 pounds per ton, premixed in a ratio of two parts dolime to one part magnesium potassium sulfate as the binder, as described herein. Minor adjustments of percent raw materials were incorporated into Formulation II to take advantage of the additional nutrient value contained in the formulation as a result of adding this nutritive binder combination.

| Formulation I | |
|---|---|
| Corn | 27.5% |
| Soybean Meal | 21.2% |
| Corn Gluten | 11.0% |
| Corn Dist. Grain | 5.2% |
| Molasses | 4.0% |
| Limestone | 1.7% |
| Salt | 0.7% |
| D.Q. Dairy Mix | 0.2% |
| Defluorinated Phosphate | 0.5% |
| Dynamate | 0.5% |
| Flavor | 0.1% |
| Wheat Mids | 25.7% |
| Lignin Sulfonate Commercial Binder | 1.65% |
| Formulation II | |
| Corn | 27.5% |
| Soybean Meal | 21.2% |
| Corn Gluten | 11.0% |
| Corn Dist. Grain | 5.2% |
| Molasses | 4.0% |
| Limestone | 0.3% |
| Salt | 0.7% |
| D.Q. Dairy Mix | 0.2% |
| Defluorinated Phosphate | 0.5% |
| Flavor | 0.1% |
| Wheat Mids | 27.3% |
| Oxide/Reactive Metal Salt Binder of this Invention | 2.0% |

The prepared meal was pelleted in conventional commercial fashion, through a ¼ by 1-½ inch pellet die. A determination of recycle fines was accomplished by sampling finished pellets from the cooler and separating fines from whole pellets through a 10 mesh screen. The percent fines was calculated by the following formula:

$$\frac{\text{Weight of Fines from Cooler}}{\text{Total Weight of Sample from Cooler}} \times 100 = \text{Percent Fines from Cooler}$$

A Pellet Durability Index (PDI) value commonly used and accepted in the industry was also determined on pellets collected and cooled and from which fines had been separated. The testing procedure consisted of tumbling 500 grams of pellets for 10 minutes at 50 rpm in a dust-tight enclosure.

The testing enclosure consists of an enclosed box 12 inches on a side by 5 inches deep rotated about an axis which is perpendicular to and centered on the 12 inch sides. A 2 inch by 9 inch angle iron is positioned along one of its 9 inch sides to a diagonal of one of the 12 inch by 12 inch sides of the enclosure. A door placed in one of the sides of the enclosure is convenient for introducing and retrieving sample.

To provide additional stress to the pellets being tested, five size 5/8 inch plated steel hex nuts were added to the pellets before tumbling. After tumbling, fines were determined by screening the sample on a wire-sieve with openings just smaller than the nominal pellet diameter. The whole pellets remaining were weighed and a durability value calculated as follows:

$$\text{Pellet Durability Index } (PDI) = \frac{\text{Wt. of Pellets After Tumbling}}{\text{Wt. of Pellets Before Tumbling}} \times 100$$

Reported below are the results of both the Pellet Durability Index and Percent recycle fines:

|  | Pellet Durability Index (PDI) | Percent Recycle Fines |
|---|---|---|
| Formulation I | 87.8 | 1.65 |
| Formulation II | 87.6 | 1.31 |

PDI values for Formulation II utilizing the oxide/reactive salt combination as the binder, and for Formulation I, utilizing lignin sulfonate, a recognized feed pelleting binder, were essentially the same. Recycle fines were reduced in Formulation II compared to Formulation I by over 20 percent.

EXAMPLE II

Under plant conditions, six tons each of the following 40 percent protein high energy feed concentrate were mixed and pelleted. Formulation III utilized lignin sulfonate binder at 33 pounds per ton of finished feed. In Formulation IV, 40 pounds of a binder combination, of this invention, consisting of calcium magnesium oxide (dolime) and magnesium potassium sulfate in a ratio of two to one, was used. Minor adjustments were incorporated in Formulation IV to take advantage of the additional nutrient value contained in the formulation as a result of adding the nutritive binder combination.

| Formulation III. | |
|---|---|
| D.Q. Dairy Mix | 1.0% |
| Soybean Meal | 66.5% |
| Defluorinated Phosphate | 5.2% |
| Limestone | 4.3% |
| Molasses | 2.8% |
| Magnesium Oxide | 0.8% |
| Dynamate | 1.2% |
| Salt | 1.5% |
| Peanut Meal | 15.0% |
| Lignin Sulfonate Commercial Binder | 1.7% |
| Formulation IV. | |
| D.Q. Dairy Mix | 1.0% |
| Soybean Meal | 68.6% |
| Defluorinated Phosphate | 5.2% |
| Limestone | 2.8% |
| Molasses | 2.8% |
| Magnesium Oxide | 0.5% |
| Dynamate | 0.6% |
| Salt | 1.5% |
| Peanut Meal | 15.0% |
| Oxide/Reactive Metal Salt Binder of this Invention | 2.0% |

A determination of recycle fines and a Pellet Durability Index value were obtained as outlined in Example I above.

Reported below are the results of both the Pellet Durability Index and recycle fines:

|  | Pellet Durability Index (PDI) | Percent Recycle Fines |
|---|---|---|
| Formulation III | 95.4 | 0.32 |
| Formulation IV | 95.4 | 0.31 |

PDI values for Formulation II utilizing the oxide/reactive salt combination as the binder compared to lignin sulfonate, a recognized feed pelleting binder, were essentially the same. Recycle fines in Formulation II compared to Formulation I were also without significant difference.

It is to be understood that the above description of the present invention is susceptible to various modifications, changes, and adaptations by those skilled in the art, and that the same are to be considered to be within the scope of the present invention, which is set forth by the claims which follow.

What is claimed is:

1. A binder composition for pelleted and compressed dry animal feed, said binder consisting essentially of a mixture of a reactive metal salt and a metal oxide or hydroxide reactive therewith, in a ratio of from about 1:4 to about 4:1, wherein the reactive metal salt is selected from the group consisting of calcium chloride, magnesium chloride, potassium chloride, aluminum chloride, magnesium sulfate, potassium sulfate, potassium magnesium sulfate, calcium sulfate, aluminum sulfate, or mixtures thereof, and said reactive metal oxide or hydroxide is selected from the group consisting of magnesium oxide, calcium oxide, aluminum oxide, potassium oxide, calcium magnesium oxide, calcium hydroxide, magnesium hydroxide, aluminum hydroxide, calcium magnesium hydroxide, potassium hydroxide, or mixtures thereof said metal salt and metal oxide or hydroxide react to form a cement like compound, said binder composition having no molasses.

2. A binder composition as set forth in claim 1, wherein said reactive metal salt is present in a concentration of from about 0.25 to about 5.0 percent by weight of the total feed formulation.

3. A binder composition as set forth in claim 1, wherein said reactive metal salt is present in a concentration of from 0.4 to about 2.0 percent by weight of the total feed formulation.

4. A binder composition as set forth in claim 1, wherein said reactive metal oxide or hydroxide is present in a concentration of from about 0.5 to about 5.0 percent by weight of the total feed formulation.

5. A binder composition as set forth in claim 1, wherein said reactive metal oxide or hydroxide is present in a concentration of from about 1.0 to about 2.5 percent by weight of the total feed formulation.

6. An animal feed composition comprising ground dry feed ingredients, minerals, vitamins, drug additives, and a molasses-free binder consisting essentially of a mixture of a reactive metal salt and a metal oxide or hydroxide reactive therewith, in a ratio of from about 1:4 to about 4:1, wherein said reactive metal salt is selected from the group consisting of calcium chloride, magnesium chloride, potassium chloride, aluminum chloride, magnesium sulfate, potassium sulfate, potassium magnesium sulfate, calcium sulfate, aluminum sulfate, or mixtures thereof, and said reactive metal oxide or hydroxide is selected from the group consisting of magnesium oxide, calcium oxide, aluminum oxide, potassium oxide, calcium magnesium oxide, calcium hydroxide, magnesium hydroxide, aluminum hydroxide, calcium magnesium hydroxide, potassium hydroxide, or mixtures thereof said metal salt and metal oxide or hydroxide react to form a cement like compound.

7. A composition as set forth in claim 6, wherein said binder comprises from about 0.25 to about 5.0 percent by weight of reactive metal salt and from about 0.5 to about 5.0 percent by weight metal oxide or hydroxide.

8. A composition as set forth in claim 7, wherein said reactive metal salt comprises from about 0.4 to about 2.0 percent of the composition.

9. A composition as set forth in claim 8, wherein the reactive metal salt is from about 50 mesh to 325 mesh in size.

10. A composition as set forth in claim 8, wherein said reactive metal oxide or hydroxide comprises from about 1.0 to about 2.5 percent by weight of the composition.

11. A composition as set forth in claim 10, wherein the reactive metal oxide or hydroxide is from about 100 mesh to about 325 mesh in size.

12. A composition as set forth in claim 7, wherein said metal salt and metal oxide or hydroxide are reactive in the presence of steam.

13. A composition as set forth in claim 12, wherein said compound is selected from metal oxysulfates and metal oxychlorides.

14. A composition as set forth in claim 7, wherein the reactive salt is magnesium potassium sulfate.

15. A composition as set forth in claim 14, wherein said metal oxide is calcium magnesium oxide.

* * * * *